United States Patent
Munshi et al.

(10) Patent No.: US 10,047,177 B2
(45) Date of Patent: Aug. 14, 2018

(54) PROCESS FOR PREPARING HALOGENATED POLYMER HAVING REDUCED RESIDUAL ACIDITY AND YELLOWNESS INDEX OF 3.5 AND BELOW

(71) Applicant: RELIANCE INDUSTRIES LIMITED, Mumbai, Maharashtra (IN)

(72) Inventors: Pradip Munshi, Vadodara (IN); Ninad Deepak Ingle, Pune (IN); Pradeep Paresh Kapadia, Mumbai (IN); Vijay Shivaji Kadam, Erando (IN); Ajit Behari Mathur, Vadodara (IN); Raksh Vir Jasra, Vadodara (IN)

(73) Assignee: RELIANCE INDUSTRIES LIMITED, Mumbai (IN)

(*) Notice: Subject to any disclaimer, the term of this patent is extended or adjusted under 35 U.S.C. 154(b) by 0 days.

(21) Appl. No.: 14/907,108

(22) PCT Filed: Jul. 24, 2014

(86) PCT No.: PCT/IN2014/000490
§ 371 (c)(1),
(2) Date: Jan. 22, 2016

(87) PCT Pub. No.: WO2015/011731
PCT Pub. Date: Jan. 29, 2015

(65) Prior Publication Data
US 2016/0159945 A1  Jun. 9, 2016

(30) Foreign Application Priority Data
Jul. 24, 2013 (IN) .......................... 2455/MUM/2013

(51) Int. Cl.
*C08F 114/06* (2006.01)
*C08F 8/22* (2006.01)
*C08F 8/20* (2006.01)

(52) U.S. Cl.
CPC .............. *C08F 114/06* (2013.01); *C08F 8/20* (2013.01); *C08F 8/22* (2013.01)

(58) Field of Classification Search
CPC . C08F 114/06; C08F 8/20; C08F 8/22; C08K 3/22; C08K 2003/2206; C08K 2003/2224; C08J 2327/24; C08J 2323/28
See application file for complete search history.

(56) References Cited

U.S. PATENT DOCUMENTS

| | | | | |
|---|---|---|---|---|
| 3,366,580 A | * | 1/1968 | Kraemer, Jr. | ............ C08J 9/143 521/145 |
| 3,551,400 A | * | 12/1970 | Takashi | ..................... C08F 8/20 525/331.6 |
| 4,352,909 A | | 10/1982 | Barada et al. | |
| 4,386,189 A | | 5/1983 | Ackerman et al. | |
| 4,730,035 A | | 3/1988 | Mark et al. | |
| 5,359,011 A | | 10/1994 | Vielhaber et al. | |
| 7,345,114 B2 | | 3/2008 | Yoshimi et al. | |
| 7,928,169 B2 | | 4/2011 | Dalal et al. | |

FOREIGN PATENT DOCUMENTS

| | | | |
|---|---|---|---|
| EP | 0599795 | | 1/1994 |
| JP | 2004-149740 | * | 5/2004 |
| WO | 0063247 | | 10/2000 |

OTHER PUBLICATIONS https://en.wikipedia.org/wiki/Calcium_hydroxide; Sep. 2016.*
Derwent abstract for JP 2004-149740; Derwent 2004-444551; 2004.*
ASTM International, Designation: E 313-05, titled Standard Practice for Calculating Yellowness and Whiteness Indices from Instrumentally Measured Color Coordinates.
ASTM International, D 1755-92 titled Standard Specification for Poly(Vinyl Chloride) Resins.

* cited by examiner

*Primary Examiner* — Roberto Rabago
(74) *Attorney, Agent, or Firm* — Fish IP Law, LLP

(57) ABSTRACT

The present disclosure provides a process for the reduction of residual acidity of halogenated polymer. The process involves treating the halogenated polymer to a physical process such as rotary vacuum drying and then neutralizing the treated halogenated polymer with alkaline metal salt solutions. The process requires less quantity of an economic neutralizing agent/base during chemical treatment, thus improving process economy without prejudicing quality of the final halogenated polymer.

6 Claims, No Drawings

PROCESS FOR PREPARING HALOGENATED POLYMER HAVING REDUCED RESIDUAL ACIDITY AND YELLOWNESS INDEX OF 3.5 AND BELOW

FIELD

The present disclosure relates to halogenated polymers. More particularly, the present disclosure relates to a process for reduction of residual impurities of halogenated polymers.

BACKGROUND

Halovinyl polymers such as polyvinyl chloride, poly-(vinylidene chloride) are used in the construction industry. Halo-vinyl polymers are subjected to post-polymerization halogenation to improve its properties such as mechanical and dielectric characteristics, and resistance to acid, oil and gasoline. Chlorinated poly-vinyl chloride (CPVC), chlorinated poly-(vinylidene chloride) (CPVDC), chlorinated ethylene-chlorotrifluoro-ethylene copolymer (CE-CTFE), chlorinated poly-propylene and chlorinated poly-ethylene are some of the well-known examples of halogenated polymers. Chlorinated vinyl chloride polymers with high mechanical and dielectric characteristics, and resistance to acid, oil and gasoline are widely used as construction materials.

Chlorinated polyvinyl chloride (CPVC) has better ductility, greater flexure and crush resistance properties than polyvinyl chloride (PVC). It can withstand corrosive water at higher temperatures than PVC, typically 40° C. to 50° C. (104° F. to 122° F.) or higher. Further, it also exhibits better non-flammable property as it is very difficult to ignite, and tends to self-extinguish in a directly applied flame. It is ideally suited for self-supporting constructions where temperatures up to 200° F. (90° C.) are required. CPVC is therefore suitable for replacement of various metals used for the preparation of pipes in corrosive conditions.

Products made by CPVC exhibit the desired properties, but have serious limitations in terms of stability and effective life. Such limitations are highly attributed to the residual acidity of the polymer resin. It has been observed that the desired stability and life span of the CPVC products can be enhanced if the acidity of the CPVC resin is maintained at or below 2000 ppm. Acidity of the chlorinated polymer resin is due to the residual chlorine and hydrochloric acid.

Various physical and chemical treatments for the removal of residual chlorine and hydrochloric acid from the polymers have been reported. Physical treatments include centrifugation, rotary drying, microwave treatment, vacuum drying, vacuum distillation, ultra-sonication, hot water treatment, passing warmed nitrogen gas and any combinations thereof. The chemical treatments generally include neutralization, using bases such as alkali metal salts of weak acids, alkaline metal salt solution, strong base, ammonium hydroxide, hydrogen peroxide, sodium hypochlorite, zeolites, polyatomic oxides and hetero-polyacids. Some processes involve a physical treatment such as centrifugation of the polymer resins followed by a chemical treatment such as treatment of the centrifuged polymer resins with bases, e.g., sodium hydroxide and sodium carbonate.

EP599795 mentions use of calcium hydroxide to trap hydrochloric acid evolved during the decomposition of polyvinyl chloride.

U.S. Pat. No. 4,730,035 mentions a process for reducing the quantity of hydrochloric acid to 266 ppm of the CPVC resin by passing dry gas through a wet CPVC resin in the presence of calcium stearate solution.

U.S. Pat. No. 5,359,011 mentions use of bases like sodium citrate and sodium borate for effective neutralization of hydrochloric acid, which gives a stability value of 60 to 80 seconds for CPVC polymer in hydrochloric conductivity test.

U.S. Pat. No. 0,063,247 mentions a process for hydrochloric acid removal by chemical treatment using peroxides and hypo-chlorites.

U.S. Pat. No. 7,345,114 mentions neutralization of the acidic liquor during chlorination using sodium hypochlorite. However, the polymer, shows light yellow colour after neutralization.

U.S. Pat. No. 4,386,189 mentions removal of residual chlorine and hydrochloric acid from chlorinated polymer resins by first subjecting it to a physical treatment followed by a chemical treatment. The physical treatment includes purging nitrogen gas through the resins to expel out chlorine from the polymer resin. The chemical treatment includes neutralization of the acidic liquor by contacting the polymer resins with suitable bases.

However, in the mentioned processes it is observed that after subjecting the chlorinated polymer to physical treatment, still a substantial amount of chlorine and hydrochloric acid remains trapped in the pores of polymer resins. This trapped residual chlorine and hydrochloric acid gets released during chemical treatment in the form of hydrochloric acid, which in turn requires neutralizing agents in large quantities. Therefore in these processes, chemical treatments are found to be more time consuming, resource intensive and less effective. Further, higher concentration of a neutralization medium increases the cost of the process and the hazardous ingredients in the effluent stream, and also increases the risk of deterioration of the texture of the polymer resins. Further, the exposure of the polymer resins to a single treatment for a longer time increases the possibility of de-hydrochlorination of the polymer resins. For example, the chemical treatment of CPVC polymer using an alkaline medium such as sodium hydroxide or sodium carbonate solution is found to be very effective for neutralization of hydrochloric acid if carried out for a short period, but with longer time period the risk of de-hydrochlorination or undesired coloration of the polymer resin increases. Similarly, structural defects can also evolve on long exposure of the polymer reins to physical treatments such as treatment with hot water, which gives a dark coloration to the resin. Some of the chemical treatment methods also requires costly chemical for effective neutralization of residual acidity which increases cost of the process.

Therefore, there exists a need for a simple, economic and environment friendly process which can effectively reduce residual chlorine and hydrochloric acid from the halogenated polymer without affecting the structure and stability of the polymer within a comparatively lesser time period, using mild chemical treatment conditions than the conventional post-chlorination processes.

DEFINITIONS

Physical treatment can be defined as any mechanical process which reduces the acidity of chlorinated polymers without any direct reaction with chlorine or hydrochloric acid.

Chemical treatment can be defined as any process which reduces the acidity of chlorinated polymers by neutralization of chlorine or hydrochloric acid.

De-hydrochlorination process can be defined as a process for removal of hydrogen and chlorine or hydrogen chloride from the chlorinated compound.

Rotary vacuum drying is a mechanical process used for the removal of a liquid, gas or any evaporable material from a solution or mixture, at reduced air pressure and reduced temperature.

Yellowness Index is a number calculated from spectrophotometric data that describes the change in colour of a polymer from clear or white toward yellow. This test is most commonly used to evaluate colour changes in a material caused by real or simulated outdoor exposure. Yellowness Index below 3.5 herein indicates a white chlorinated polymer, free of visually detectable area of discolouration.

OBJECTS

Some of the objects of the present disclosure are described herein below:

It is an object of the present disclosure to ameliorate one or more problems of the prior art or to provide a useful alternative.

It is an object of the present disclosure to provide an efficient, simple and environment friendly process for the reduction of residual chlorine and hydrochloric acid from chlorinated polymers.

It is another object of the present disclosure to reduce the acidity of the chlorinated polymer up to 2000 ppm and below, thereby improving its stability, particularly thermal stability and dynamic mechanical properties.

It is yet another object of the present disclosure to reduce the acidity of the chlorinated polymer up to 2000 ppm and below, simultaneously maintaining the yellowness index of the chlorinated polymer 3.5 and below.

It is yet another object of the present disclosure to use mild reaction conditions for the removal of residual chlorine and hydrochloric acid from chlorinated polymers to preserve the texture of the polymer.

Other objects and advantages of the present disclosure will be more apparent from the following description which is not intended to limit the scope of the present disclosure.

SUMMARY

In accordance with the present disclosure, there is provided a process for the reduction of residual acidity of a halogenated polymer to 2000 ppm and below, simultaneously maintaining yellowness index of the halogenated polymer to 3.5 and below during the process, the process comprising:
  subjecting the halogenated polymer to rotary vacuum drying; and
  neutralizing the rotary vacuum dried halogenated polymer with alkaline metal salt solutions, such as hydroxide of an alkaline metal selected from the group consisting of Calcium (Ca), Magnesium (Mg), Beryllium (Be), Strontium (Sr) and Barium (Ba).

DETAILED DESCRIPTION

Chlorinated polyvinyl polymers (CPVC) made by chlorination of polyvinyl chloride (PVC) contains residual chlorine and hydrochloric acid trapped in the pores and on the surface of the polymer and shows acidity above 12000 ppm. Such CPVC resins are unstable and not processable for compounding.

The present disclosure provides a process for reduction of acidity below 2000 ppm and simultaneously maintaining yellowness index of halogenated polymers below 3.5. The process involves subjecting the halogenated polymers to a physical and/or a chemical treatment.

In various embodiments of the present disclosure, the physical treatment is but not limited to centrifugation, rotary drying, microwave treatment, vacuum drying, rotary vacuum drying, vacuum distillation, ultra-sonication, hot water treatment and treatment with nitrogen gas.

In various embodiments of the present disclosure, the chemical treatment is but not limited to neutralization using a neutralization agent such as an alkali metal salt of a weak acid, alkaline metal salt solutions, ammonium hydroxide, hydrogen peroxide, sodium hypochlorite, zeolites, poly-atomic oxides and hetero-polyacids.

In a preferred embodiment of the present disclosure, the halogenated polymer is first subjected to a physical treatment to remove the residual chlorine and hydrochloric acid trapped in the pores and on the surface of the polymer and then subjected to a chemical treatment. This combination of a physical treatment followed by a chemical treatment helps in effective and efficient reduction of residual acidity without requiring neutralizing agent in large quantity and high concentration and takes relatively lesser time to reduce the residual acidity at 2000 ppm.

In a most preferred embodiment of the present disclosure, the physical treatment involves rotary vacuum drying and the chemical treatment involves neutralizing the treated polymer with an alkaline hydroxide solution selected from the group consisting of beryllium (Be), magnesium (Mg), calcium (Ca), strontium (Sr) and barium (Ba) hydroxides.

In an exemplary embodiment of the present disclosure, the halogenated polymers are subjected to a rotary vacuum drying for a period of 1 hour to 5 hours, at a temperature in the range of 20° C. to 90° C. and pressure in the range of 1 to 5 torr, and then treated with a calcium hydroxide solution at a temperature in the range of 20° C. to 60° C. (for example, 20° C. to 40° C.). The concentration of calcium hydroxide solution is maintained in the range of 0.005M to 0.05 M (for example, 0.005M to 0.02M).

In accordance with the process of the present disclosure, the acidity of the chlorinated polymer is reduced to 2000 ppm and the yellowness index is maintained to 3.5 and below. The low residual acidity chlorinated polymer so obtained is white and free of visually detectable areas of discolouration.

The disclosure is further illustrated with the help of the following examples which should not be construed to limit the disclosure in any way.

EXAMPLE 1

Preparation of Chlorinated Polyvinyl Polymers

The chlorinated polyvinyl polymers (CPVC) slurry obtained after chlorination of polyvinyl polymers was filtered and washed with water till neutral. The wet cake was dried under reduced pressure at 55° C. for 2 h. The dried CPVC powder was further treated with 0.0125(N) solution of calcium hydroxide, in a ratio 10:1 of $Ca(OH)_2$/CPVC v/wt. The slurry was then filtered and washed and dried at 70° C. for 3 h. Acidity of CPVC resin was found to be 12000 ppm.

Experiments 2-30

100 gms of dried CPVC resin (12000 ppm acidity) as obtained in the Example 1 was subjected to various combinations of physical and/or chemical treatments as shown in table 1. Dried powder was tested for colour and acidity. Yellowness index was measured using CIE Lab colour values.

TABLE 1

| Ex No. | Treatments | Experimental Detail | Resin color (Visual) and (Yellowness Index) | Acidity (ppm) before treatment | Acidity (ppm) after treatment |
|---|---|---|---|---|---|
| 1 | Washing with water 20-30° C. | 100 g of CPVC was taken in a 1 L conical flask, 500 mL water was added and the mixture was agitated for 20 min at 20 to 30° C. and filtered. The process was repeated twice. The wet cake obtained was dried under vacuum for 3 hr at 70° C. | Brownish YI 7.6 | 12000 | 10000 |
| 2 | Washing with water 60-80° C. | 100 g of CPVC was taken in a 1 L conical flask, 500 mL water was added and the mixture was agitated for 20 min at 60 to 80° C. and filtered. The process was repeated twice. The wet cake obtained was dried under vacuum for 3 hr at 70° C. Dried powder was tested for stability and colour. | Brownish Black YI 7.9 | 12000 | 10000 |
| 3 | Ultrasonication | 100 g of CPVC was taken in a 1 L conical flask, 500 mL water was added and the mixture was ultrasonicated at 50 Hz for 10 min at 20 to 30° C. and filtered. The process was repeated twice. The wet cake obtained was dried under vacuum for 3 hr at 70° C. | White YI 5.4 | 12000 | 8000 |
| 4 | Washing with methanol at 20-30° C. | 100 g of CPVC was taken in a 1 L conical flask, 500 mL methanol was added and the mixture was agitated for 20 min at 20 to 30° C. and filtered. The process was repeated twice. The wet cake obtained was dried under vacuum for 3 hr at 70° C. | White YI 5.1 | 12000 | 10000 |
| 5 | Microwave | 100 g of CPVC was taken in a 1 L conical flask, 500 mL water was added and the flask was exposed to microwave treatment for 5 min. Mixture was then filtered. Wet cake dried under vacuum for 3 hr at 70° C. | White YI 5.4 | 12000 | 9000 |
| 6 | Nitrogen purging-27° C. | 100 g of CPVC was dried under flow of nitrogen (60 g/h) for 1 hr. The material was dried under vacuum for 3 hr at 70° C. | White | 12000 | 11500 |
| 7 | Nitrogen purging-70° C. | 100 g of CPVC was as dried under a flow of hot nitrogen at 70° C. at a flow 60 g/h for 1 hr. The material was dried under vacuum for 3 hr at 70° C. | Brownish | 12000 | 10000 |
| 8 | Rotary Vacuum drying (<2 torr) | 100 g of CPVC was dried under reduced pressure of less than 2 torr using rotary vacuum drier for 2 hr. The material was dried under vacuum for 3rh at 70° C. | White YI 3.85 | 12000 | 7000 |
| 9. | Centrifugation | 10 g of CPVC was centrifuged at 2000 rpm in a 30 mL centrifugal tube for 15 min. Solid wet powder was dried under vacuum for 3 h at 70° C. | Colour YI 3.70 | 12000 | 4500 |
| 10 | Sodium hydroxide | 100 g of CPVC was taken in a 1 L conical flask, 500 mL of 0.0125 (M) sodium hydroxide was added and the mixture was stirred for 30 min, the mixture was filtered and the was washed three times with 500 mL of water. Solid wet powder was dried under vacuum for 3 hr at 70° C. | Colour YI 5.9 | 12000 | 1700 |
| 9 | Sodium Benzoate (0.5M) | 100 g of CPVC was taken in a 1 L conical flask, 500 mL of 0.5 (M) Sodium Benzoate was added and the mixture was stirred for 30 min, the mixture was filtered and was washed three times with 500 mL of water. Solid wet powder was dried under vacuum for 3 hr at 70° C. | Brownish | 12000 | 10000 |

TABLE 1-continued

| Ex No. | Treatments | Experimental Detail | Resin color (Visual) and (Yellowness Index) | Acidity (ppm) before treatment | Acidity (ppm) after treatment |
|---|---|---|---|---|---|
| 10 | Sodium Citrate (0.5M) | 100 g of CPVC was taken in a 1 L conical flask, 500 mL of 0.5 (M) Sodium citrate was added and stirred for 30 min, the mixture was filtered and washed three times with 500 mL water. Solid wet powder was dried under vacuum for 3 hr at 70° C. | White | 12000 | 9500 |
| 11 | Sodium Borate (0.1M) | 100 g of CPVC was taken in a 1 L conical flask,. 500 mL of 0.1 (M) Sodium borate was added and the mixture was stirred for 30 mins, filtered and washed three times with 500 mL water. Solid wet powder was dried under vacuum for 3 hr at 70° C. | White YI 4.1 | 12000 | 10000 |
| 12 | Sodium Acetate | 100 g of CPVC was taken in a 1 L conical flask, 500 mL of 0.5 (M) Sodium acetate was added and stirred for 30 min. The mixture was filtered and washed three times with 500 mL water. Solid wet powder was dried under vacuum for 3 hr at 70° C. | Brownish YI 6.3 | 12000 | 9000 |
| 13 | Sodium Phosphate | 100 g of CPVC was taken in a 1 L conical flask, 500 mL of 0.5 (M) tri sodium phosphate was added and stirred for 30 min. The mixture was filtered and washed three times with 500 mL water. Solid wet powder was dried under vacuum for 3 hr at 70° C. | Brownish YI 6.5 | 12000 | 10000 |
| 14 | Sodium Bicarbonate | 100 g of CPVC was stirred with 500 mL of 0.5 (M) Sodium bicarbonate for 30 min. The mixture was filtered and washed three times with 500 mL water. Solid wet powder was dried under vacuum for 3 hr at 70° C. | Brownish YI 6.7 | 12000 | 10000 |
| 15 | Hydrotalcite | 100 g of CPVC was taken in a 1 L conical flask, 500 mL water was added. 10 g of hydrotalcite was tied in a thimble cloth and dipped into the solution. Mixture was stirred for 30 min, filtered and washed three times with 500 mL water. Solid wet powder was dried under vacuum for 3 h at 70° C. | White YI 4.3 | 12000 | 8000 |
| 16 | Sodium hypochlorite | 100 g of CPVC was taken in a 1 L conical flask, 500 mL water was added. 10 ml of 4% hypochlorite was tied in a thimble cloth and dipped into the solution. Mixture was stirred for 30 min, filtered and washed three times with 500 mL water. Solid wet powder was dried under vacuum for 3 h at 70° C. | Brownish YI 7.2 | 12000 | 10000 |
| 17 | Hydrogen peroxide | 100 g of CPVC was taken in a 1 L conical flask, 500 mL water was added. 10 mL of 30% hydrogen peroxide was added into the solution. Mixture was stirred for 30 min, filtered and washed three times with 500 mL water. Solid wet powder was dried under vacuum for 3 h at 70° C. | White YI 4.3 | 12000 | 10000 |
| 18 | Ammonia solution (0.05M) | 100 g of CPVC was taken in a 1 L conical flask. 500 mL 0.05 (M) ammonia solution was added. Mixture was stirred for 30 min, filtered and washed three times with 500 mL water. Solid wet powder was dried under vacuum for 3 h at 70° C. | Off White YI 5.7 | 12000 | 9500 |
| 19 | Calcium hydroxide | 100 g of CPVC was taken in a 1 L conical flask, 500 mL of 0.0125 (M) calcium hydroxide was added and the mixture was stirred for 30 min, the mixture was filtered and the was washed three times with 500 mL of water. Solid wet powder was dried under vacuum for 3 hr at 70° C. | light brownish YI 5.50 | 12000 | 1800 |

TABLE 1-continued

| Ex No. | Treatments | Experimental Detail | Resin color (Visual) and (Yellowness Index) | Acidity (ppm) before treatment | Acidity (ppm) after treatment |
|---|---|---|---|---|---|
| 20 | Rotary vacuum drying and Neutralization using Sodium citrate | 100 g of CPVC was dried in a 1 L Rotary vacuum dryer at temperature 45° C. and vacuum 2 torr for 3 hr. Dried material was neutralized using 500 mL of 0.5 (M) sodium citrate for 30 min. Mixture was stirred for 30 min, filtered and washed three times with 500 mL water. Solid wet powder was dried under vacuum for 3 hr at 70° C. | White YI 3.5 | 12000 | 7000 |
| 21 | Centrifugation and Neutralization using 0.5M Sodium citrate | 10 g of CPVC was centrifuged at 2000 rpm in a 30 mL centrifugal tube for 15 min. Dried material was neutralized using 500 mL of 0.5 (M) sodium citrate for 30 min. Mixture was stirred for 30 min, filtered and washed three times with 500 mL water. Solid wet powder was dried under vacuum for 3 h at 70° C. | White YI 4.2 | 12000 | 7700 |
| 22 | Sodium citrate neutralization and nitrogen purging | 100 g of CPVC was stirred with 500 mL of 0.5 (M) Sodium citrate for 30 min. The mixture was filtered, washed three times with 500 mL water. Solid wet powder was dried under flow of nitrogen for 3 h. Solid material was taken for testing. | Off white YI 4.8 | 12000 | 7500 |
| 23 | Calcium Hydroxide and Rotary vacuum drying | A mixture containing 100 g of CPVC and 500 mL of 0.0125 (M) calcium hydroxide was stirred for 30 min, the mixture was filtered and washed three times with 500 mL of water. Solid wet powder was dried in a 1 L Rotary vacuum dryer at temperature 45° C. and vacuum 2 torr for 3 hr and further dried under vacuum for 3 hr at 70° C. | Colour YI 3.92 | 12000 | 6000 |
| 24 | Centrifugation and treatment with calcium hydroxide | 10 g of CPVC was centrifuged at 2000 rpm in a 30 mL centrifugal tube for 15 min. Dried material was neutralized using 500 mL of 0.5 (M) calcium hydroxide for 30 min. Mixture was stirred for 30 min, filtered and washed three times with 500 mL water. Solid wet powder was dried under vacuum for 3 h at 70° C. | Colour YI 3.5 | 12000 | 2500 |
| 25 | Centrifugation and treatment with sodium hydroxide | 10 g of CPVC was centrifuged at 2000 rpm in a 30 mL centrifugal tube for 15 min. Dried material was neutralized using 500 mL of 0.5 (M) sodium hydroxide for 30 min. Mixture was stirred for 30 min, filtered and washed three times with 500 mL water. Solid wet powder was dried under vacuum for 3 h at 70° C. | Colour YI 6.8 | 12000 | 2200 |
| 26 | Rotary vacuum drying and Neutralization using Calcium Hydroxide | 100 g of CPVC was dried in a 1 L Rotary vacuum dryer at temperature 45° C. and vacuum below 2 torr for 3 hr. Dried material was neutralized using 500 mL of 0.0125 (M) calcium hydroxide and the mixture was stirred for 30 min, filtered and washed three times with 500 mL water. Solid wet powder was dried under vacuum for 3 hr at 70° C. | White YI 3.26 | 12000 | 2000 |
| 27 | Rotary vacuum drying and Neutralization using alkaline hydroxide, selected from (Be), (Mg), (Sr) and (Ba)/ | Experiment carried out in accordance with experiment 23. | white YI 3.26 | 12000 | 2000 |

From table 1, it is observed that the process carried out in accordance with the experimental conditions illustrated in experiments 26 and 27, which includes subjecting halogenated polymers first to rotatory vacuum drying and then treating the halogenated polymer with a suitable alkaline hydroxide selected from the group consisting of Ca, Mg, Be, Sr and Ba hydroxide provides for an effective reduction of acidity from halogenated polymers, reducing the acidity to 2000 ppm and maintaining the yellowness index below 3.5.

TECHNICAL ADVANCEMENT

The process of the present disclosure which includes a combination of a physical and chemical treatment of CPVC reduces the acidity of the halogenated polymers to 2000 ppm. The process of the present disclosure has the following advantages:
- Requires less quantity of a neutralizing agent /base during chemical treatment, thereby improving the load capacity of the reactor.
- Obviates the use of harsh alkali solution for neutralization during chemical treatment, thereby making the process economical and environment friendly
- Prevents undesired coloration of the polymer resins, and
- Improves thermal stability and dynamic mechanical properties of the chlorinated polymer resins.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like that has been comprised in this specification is solely for the purpose of providing a context for the invention. It is not to be taken as an admission that any or all of these matters form part of the prior art base or were common general knowledge in the field relevant to the invention as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning, and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

"Whenever a range of values is specified, a value up to 10% below and above the lowest and highest numerical value respectively, of the specified range, is comprised in the scope of the disclosure".

While considerable emphasis has been placed herein on the preferred embodiments, it will be appreciated that many embodiments can be made and that many changes can be made in the preferred embodiments without departing from the principles of the disclosure. These and other changes in the preferred embodiments as well as other embodiments of the disclosure will be apparent to those skilled in the art from the disclosure herein, whereby it is to be distinctly understood that the forgoing descriptive matter to be implemented merely as illustrative of the disclosure and not as limitation.

The invention claimed is:

1. A process for preparing a halogenated polymer having a residual acidity of 2000 ppm and having a yellowness index of 3.5 and below, said process comprising:
   i. halogenating a polymer with a halogen to obtain a halogenated polymer;
   ii. washing and drying said halogenated polymer;
   iii. treating said dried and washed halogenated polymer with a first alkaline metal salt solution, followed by filtering, washing, and drying to obtain a treated halogenated polymer;
   iv) subjecting said treated halogenated polymer to rotary vacuum drying, thereby obtaining a rotary vacuum drier treated halogenated polymer; and
   v) neutralizing the rotary vacuum drier treated halogenated polymer with a second alkaline metal salt solution to obtain the halogenated polymer having a residual acidity of
   2000 ppm and having a yellowness index of 3.5 and below.

2. The process as claimed in claim 1, wherein step (iv) is carried out for a period of 1-5 hours, at a temperature in the range of 20 to 90° C. and under a vacuum in the range of 1 to 5 torr.

3. The process as claimed in claim 1, wherein the alkaline metal salt solution is a hydroxide of an alkaline metal selected from the group consisting of Calcium (Ca), Magnesium(Mg), Beryllium(Be), Strontium(Sr) and Barium (Ba).

4. The process as claimed in claim 1, wherein neutralization in step (v) utilizes 0.005M to 0.02M calcium hydroxide solution at a temperature in the range of 20 to 40°C.

5. The process as claimed in claim 1, wherein the halogenated polymer is chlorinated polyvinyl chloride (CPVC).

6. The process as claimed in claim 1, wherein the halogen is chlorine.

* * * * *